(12) United States Patent
Chen et al.

(10) Patent No.: US 7,599,364 B2
(45) Date of Patent: Oct. 6, 2009

(54) CONFIGURABLE NETWORK CONNECTION ADDRESS FORMING HARDWARE

(75) Inventors: Jian-Guo Chen, Basking Ridge, NJ (US); Nevin C. Heintze, Bethlehem, PA (US); Hakan I. Pekcan, Basking Ridge, NJ (US); Cheng Gang Duan, Shanghai (CN); Kent E. Wires, Mine Hill, NJ (US); Lin Hua, Shanghai (CN)

(73) Assignee: Agere Systems Inc., Allentown, PA (US)

( * ) Notice: Subject to any disclaimer, the term of this patent is extended or adjusted under 35 U.S.C. 154(b) by 563 days.

(21) Appl. No.: 11/226,507

(22) Filed: Sep. 13, 2005

(65) Prior Publication Data

US 2007/0058633 A1    Mar. 15, 2007

(51) Int. Cl.
H04L 12/28 (2006.01)
H04L 12/56 (2006.01)
H04J 3/16 (2006.01)
H04J 3/22 (2006.01)
H04J 3/24 (2006.01)
G06F 15/16 (2006.01)

(52) U.S. Cl. .................. 370/389; 370/392; 370/393; 370/401; 370/466; 370/474; 709/228; 709/236; 709/249

(58) Field of Classification Search ............... 370/389, 370/392; 711/211–218
See application file for complete search history.

(56) References Cited

U.S. PATENT DOCUMENTS

| 5,371,877 | A |   | 12/1994 | Drako et al. |
| 5,553,269 | A |   | 9/1996 | Nunes |
| 5,659,687 | A |   | 8/1997 | Kim et al. |
| 5,684,954 | A | * | 11/1997 | Kaiserswerth et al. ...... 370/393 |
| 5,937,169 | A |   | 8/1999 | Connery et al. |
| 5,974,482 | A |   | 10/1999 | Gerhart |
| 6,449,656 | B1 |   | 9/2002 | Elzur et al. |
| 6,453,394 | B2 |   | 9/2002 | Miki et al. |
| 6,697,868 | B2 |   | 2/2004 | Craft et al. |
| 6,732,252 | B2 |   | 5/2004 | Miki et al. |
| 6,788,704 | B1 |   | 9/2004 | Lindsay |
| 6,868,459 | B1 |   | 3/2005 | Stuber |
| 6,876,941 | B2 |   | 4/2005 | Nightingale |
| 6,901,072 | B1 | * | 5/2005 | Wong ..................... 370/389 |
| 6,920,510 | B2 |   | 7/2005 | Chang et al. |

(Continued)

OTHER PUBLICATIONS

ARM, AMBA AXI Protocol v1.0 Specification, Copyright 2003, 2004, 108 pages.

(Continued)

*Primary Examiner*—Jayanti K Patel
*Assistant Examiner*—Cassandra Decker

(57) ABSTRACT

An apparatus and method are provided for extracting connection information from a traffic header in a communications network. The apparatus includes a first storage element containing a first look-up table for determining a first data packet header offset and data size for extracting a communications protocol type from the header and a second storage element containing a second look-up table for determining from the communications protocol type a second data packet header offset and second data size for extracting a connection address from the header. The storage elements may be in the form of content-addressable memories. Exception handling and hardware initialization can be controlled by a system processor.

11 Claims, 4 Drawing Sheets

U.S. PATENT DOCUMENTS

| | | | |
|---|---|---|---|
| 7,236,492 B2 * | 6/2007 | Davis et al. | 370/392 |
| 2002/0194263 A1 * | 12/2002 | Murren et al. | 709/203 |
| 2002/0194363 A1 * | 12/2002 | Jha | 709/236 |
| 2003/0067934 A1 * | 4/2003 | Hooper et al. | 370/428 |
| 2004/0042483 A1 | 3/2004 | Elzur et al. | |
| 2004/0133713 A1 | 7/2004 | Elzur | |
| 2004/0153578 A1 | 8/2004 | Elzur | |
| 2004/0249957 A1 | 12/2004 | Ekis et al. | |
| 2005/0021680 A1 | 1/2005 | Ekis et al. | |

OTHER PUBLICATIONS

Tanenbaum, Andrew S., Structured Computer Organization, 1984, Prentice-Hall, Inc., pp. 10-12.

ARM, The Architecture for the Digital World, http://www.arm.com/products/CPUs/, Sep. 1, 2005.

ARM, The Architecture for the Digital World, http://www.arm.com/contact_us/offices.html/, Sep. 1, 2005.

Information Sciences Institute University of Southern California, Transmission Control Protocol Darpa Internet Program Protocol Specification, Sep. 1981, pp. 1-88, Marina del Rey, California.

ARM, Advanced High-Performed Bus (AHB), AMBA AHB, ARM IHI 0011A, © Copyright ARM Limited 1999, Chapter 3, pp. 3-1-3-54.

ARM, AMBA Specification, Rev. 2.0. ARM, 1999, 34 pages.

* cited by examiner

CONFIGURABLE NETWORK CONNECTION ADDRESS FORMING HARDWARE

TECHNICAL FIELD

The present invention relates generally to computer networks and, in particular, to the decoding of address header information.

BACKGROUND

A fundamental feature of most network communications, including the Internet, is the layered approach to transmission protocol based on the OSI reference model. Equally fundamental is the concept of transmitting information in piecemeal fashion through packetized data, or "packets". In order for two devices to exchange packets of information across a network, each packet includes a header. The header contains information that defines the connection. In a network using the TCP/IP protocol stack, for example, a connection typically is defined at a minimum by information relating to OSI layers 3 (network) and 4 (transport). Typically five pieces of information define the connection: IP source address, IP destination address, IP protocol, TCP source port, and TCP destination port.

The information defining the connection is typically contained in fields within the packet header, and these fields can fall in different positions and may have different lengths within the header, depending on the protocols and protocol versions used by the various layers. Thus, extracting the fields that define a connection is not a trivial process. Prior art systems have used a processor associated with the logical device receiving or sending communications to decode and extract connection information. This processor-based approach is time-consuming and decreases processor availability for other tasks, especially where a single logical device may monitor and extract header fields from incoming messages of multiple active connections.

An alternate approach to extract header fields unburdens the processor by using dedicated hardware to extract connection data from header fields. One problem with such an approach is that dedicated hardware cannot adapt to new protocols and header configurations, unlike a programmable general purpose processor, which can adapt to new header topography through software modifications.

SUMMARY OF THE INVENTION

Processing a header of a data packet involves i) generating, with a first look-up table, a first data packet header offset and a first data size corresponding to a communications protocol type; ii) extracting the communications protocol type of the header; iii) generating, with a second look-up table, a second data packet header offset and a second data size corresponding to a first partial connection address offset based on the communications protocol type; and iv) extracting the first partial connection address from the header based on the first partial connection address offset and second data size information.

BRIEF DESCRIPTION OF THE DRAWINGS

The invention is best understood from the following detailed description when read with the accompanying drawing figures. Like reference numerals designate corresponding parts throughout the figures.

DETAILED DESCRIPTION

In the following detailed description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

Figure 1:
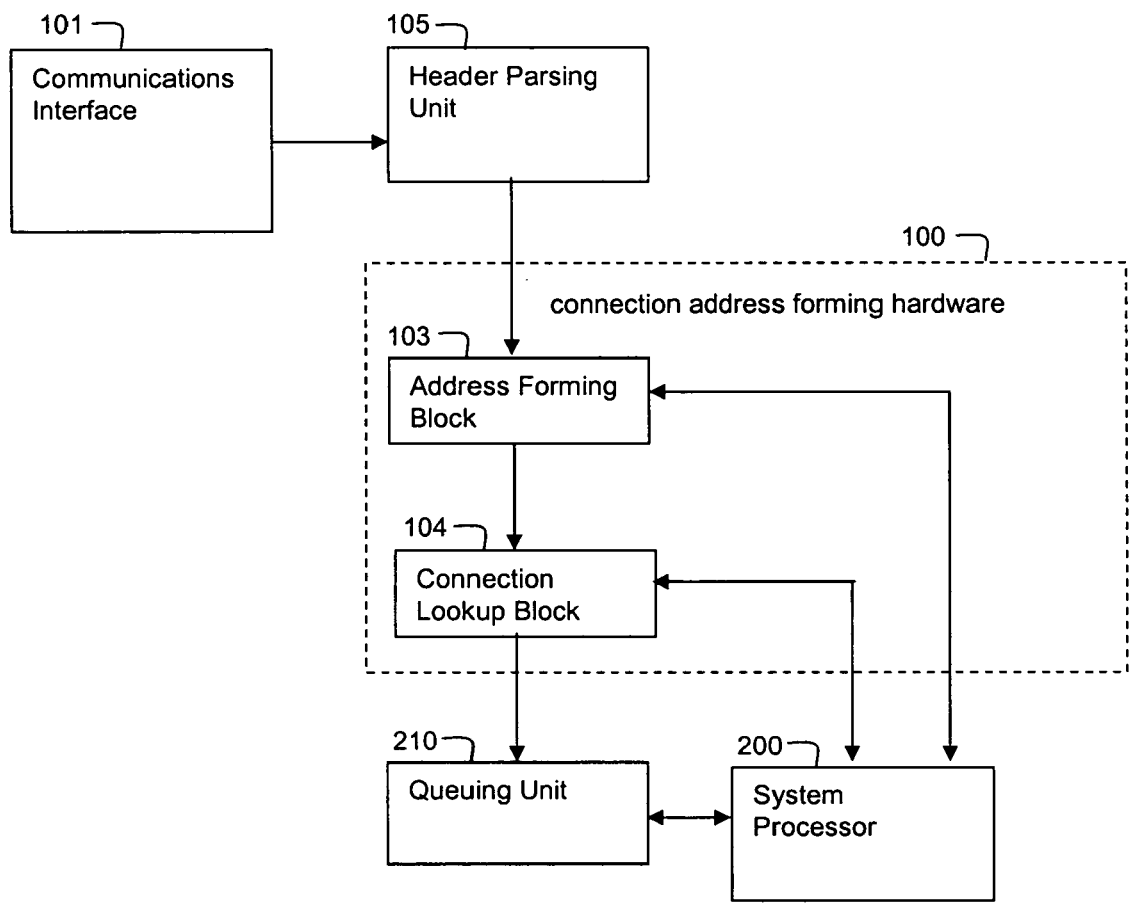
FIG. 1 is a block diagram of a system including exemplary connection lookup offload hardware.

FIG. 1 is a block diagram of a system including exemplary TCP offload hardware. With reference to FIG. 1, in some embodiments, communications interface 101 receives packetized data including a packet header. The packet header is extracted and processed by Header Parsing Unit 105. Connection address forming hardware 100 includes address-forming block 103 and connection-lookup block 104. Queuing Unit 210 receives the connection address information as processed by the connection address forming hardware 100. System processor 200 handles exceptional cases, such as data packets that differ from a standard packet in at least one attribute, which may include, but is not limited to packet checksum errors, invalid packet protocol, content addressable memory table look-up misses and packet arrival to a zero object length connection, setup and initialization of address-forming block 103, and setup and initialization of connection-lookup block 104.

Figure 2:
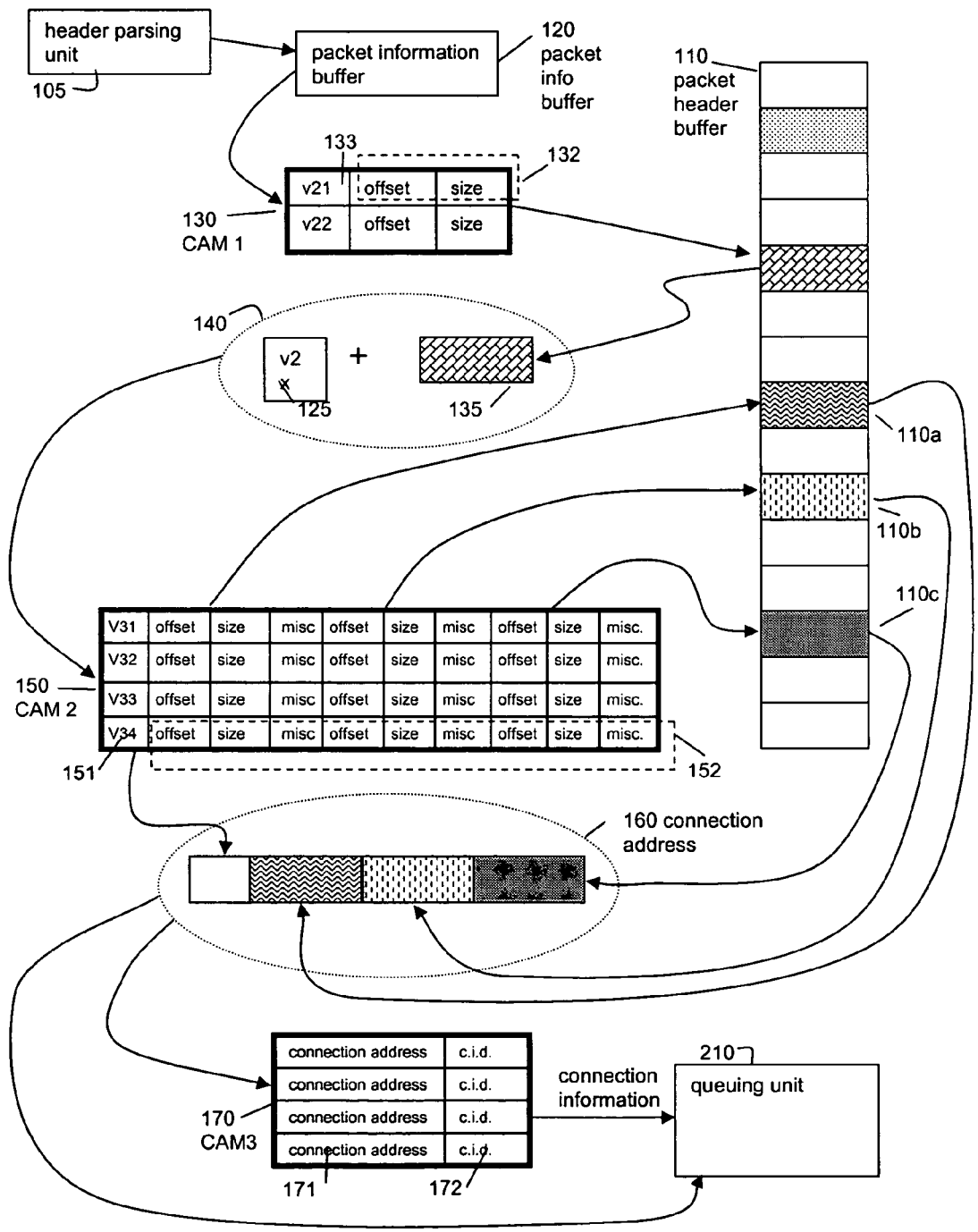
FIG. 2 is a block diagram of an exemplary header decomposition process.

In an exemplary communications network, connection address information is processed by at least two OSI layers, and the connection address and layer information are spread out in various sections of a data packet header. With reference to FIG. 2, a protocol version number of a first level, (level A) is extracted from a data packet header by system processor 200, or by other hardware such as Header Parsing Unit 105, prior to the header reaching the packet information buffer 120 of the connection lookup hardware. Both the level A version number and the header are communicated to the packet information buffer 120 of the connection address-forming hardware 100.

Next, the version number is applied to first content addressable memory (CAM), CAM1 130. The contents of CAM1 130 is a table including the possible level A version numbers. Index 133 of a CAM entry whose data matches the input version number is used to address position register 132. The data in the position register at each index value includes header offset and size information for determining where to find level B protocol information in the header.

The address forming block 103 extracts the level B protocol information from the header and appends the level B protocol information to the level A version number (shown in FIG. 2 as concatenated data word 140 including components 125, 135).

Concatenated data word 140 is then used to match data in a table of second CAM, CAM2 150. The number of entries in table 150 is equal to the number of combinations of unique level A versions and level B protocols that the system has received and processed since the system's first power up. The data at each index entry 151 in CAM2 150 includes the corresponding possible combinations of version number and protocol type. The data in position register 152 pointed to by the same index entry 151 includes offset and size information for determining one or more locations of connection address information in the header. The offset and size information can be contained in a plurality of non-contiguous sections of the header.

The offset and size information is then used to extract connection address sections 110a, 110b, 110c from the header. These connection address sections 110a, 110b, and 110c are then concatenated together to form connection address 160. Connection address 160 is input into third CAM, CAM3 170, to find a possible matching entry in a table contained therein. The table in CAM3 170 has the same number of possible indices as the number of connection addresses that the system is designed to support, as indicated by rows in CAM3 170 in FIG. 2. Index 171 of a CAM entry, for which the corresponding datum 172 matches one of the formed connection addresses previously processed by the system, is regarded as the connection identification number for the arriving packet.

in some embodiments, the connection identification number can also be used as an index to access another table, such as, for example, a connection table for which the data at each index include a number of fields to be used by other functional blocks to process the data packet. These fields may include a queue identification field for traffic management (i.e., a field that indicates where the data portion of the data packet should be stored in memory accessed by system processor 200).

Figure 3:
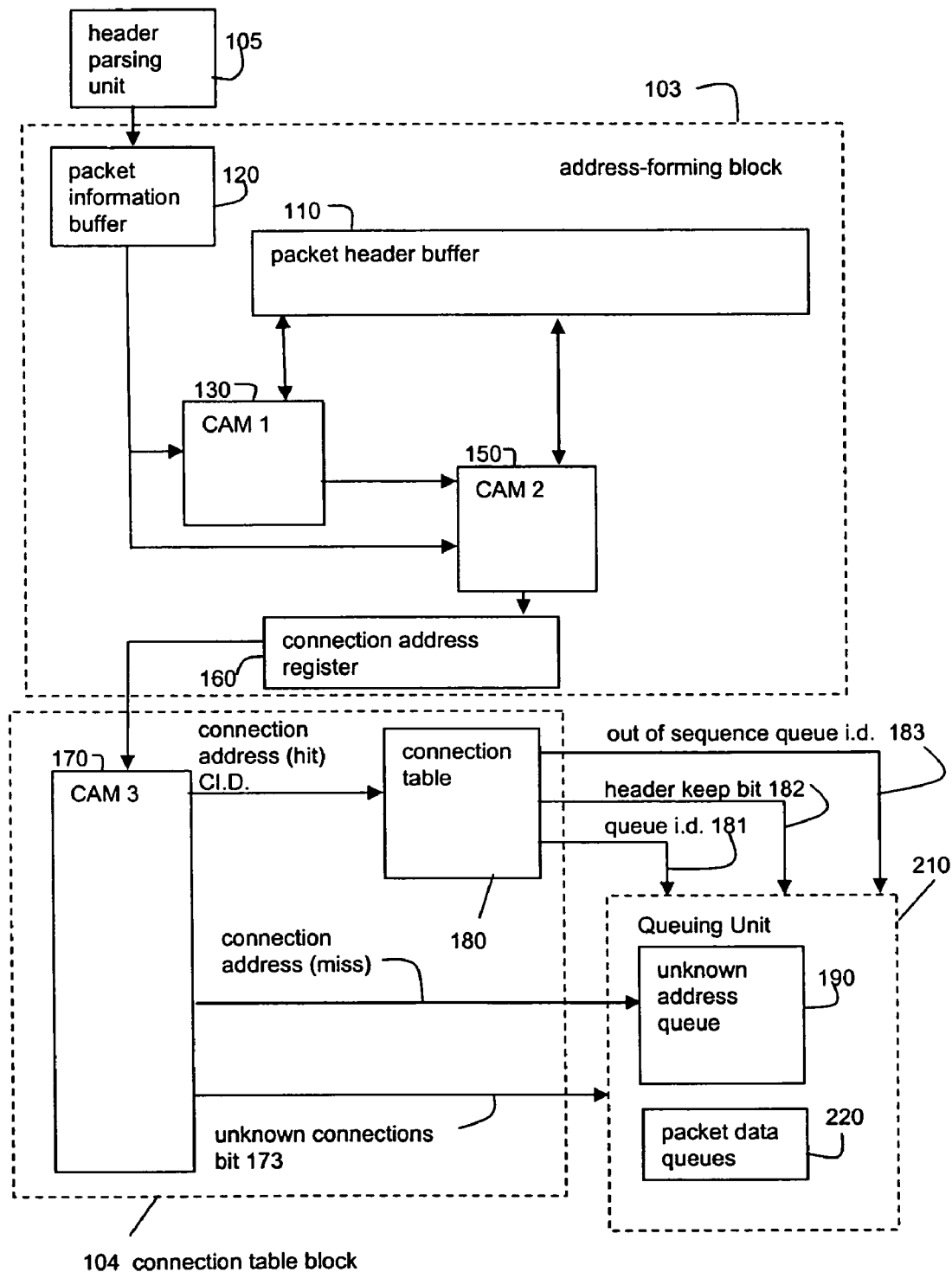
FIG. 3 is a block diagram of exemplary hardware for connection address forming hardware.

The two main blocks of an exemplary connection lookup hardware system are address forming block 103 (FIG. 3, including elements 110, 120, 130, 150 and 160) and connection table block 104 (FIG. 3, including elements 170 and 180). Exemplary embodiments of each of these are described in more detail below.

Address Formation

Address Forming block 103 constructs a CAM lookup address (for, e.g., CAM1 130 and CAM2 150) by extracting information from the incoming traffic packet header. The position and size of the header fields to be extracted depend on the traffic protocol in use. Each CAM lookup address represents a unique connection. For the most popular internet traffic (carried in IP V4 and TCP/UDP protocol), the source IP address, destination IP address, TCP/UDP source port number, TCP/UDP destination port number and protocol type (so-called "five-tuple" from the packet header) defines a unique connection. Other fields may be used to determine a connection, if a packet is based on a different traffic protocol (such as IP V6).

The exemplary design described herein is not limited to Internet Protocol V4/TCP/UDP protocol suite. Therefore, the connection-address-forming scheme is designed to allow connection addresses to be extracted from different configurable header positions. The address forming process is designed as a "protocol aware" hierarchical process, in which the process deconstructs the packet header in stages and is capable of doing so for a plurality of combinations of protocol versions. In some embodiments, the whole process is divided into three stages as detailed below. Other embodiments (not shown) may include a different number of stages.

With reference to FIG. 3 and using the example of the IP V4/TCP/UDP protocol suite, the first stage of the address forming process checks the version number of the layer three (L3) protocol. This field has been extracted by header parsing unit 105 prior to the header being communicated to connection-address-forming hardware 103. This protocol version number is stored in arriving packet information buffer 120 when the address forming process starts. The address forming process extracts a first level of protocol (e.g., version number for IP protocol) from the packet information buffer 120. The packet information buffer 120 can also contain other information about the IP layer including packet length, header offset, and IP header length. In some embodiments, this other information may be used in the connection address lookup process, but for the described example only the IP version number is used.

For the second and third stages in the address forming process, composite hardware tables of, for example, CAM1 130 and CAM2 150 are allocated, although for other embodiments more or less hardware tables might be used. The number of table entries in each address forming process stage depends on the stage the table is employed in and the number of different protocols to be supported at each stage. Each table entry is a composite table entry that includes a CAM entry (e.g. CAM entries 133, 151) and a position register entry (e.g., position register entries 131, 152).

For each CAM entry there is a corresponding offset/size field pair, also referred to herein as the position register entry. The offset field value specifies the number of bytes to be skipped from the beginning of packet header at each level to the field to be extracted. The size field value specifies the number of nibbles to be extracted. The number of CAM entries for each table is equal to the number of specific different protocol combinations that the system has processed since first power-on or initialization.

One feature of this composite table entry is that the CAM entry and position register entry share the same index value. For example, in CAM1 130 and CAM2 150, each position register is composed of at least a pair of offset/size fields 132, 152. Each of CAM entries 133, 151 stores the specific protocol values for the corresponding position register and acts as an index into the table.

In some embodiments, the header length at each level of the protocol is not necessarily of fixed length. For example, both TCP and IP header lengths can vary due to inclusion of "option" fields. However, each packet header length is generally a fixed length within packets of a single connection. The varying header length from an outer level of the protocol might have a significant impact on all field positions of inner level protocol, including the inner level header length itself. In order to accommodate the varying header length, the protocol header length field might also be extracted as part of the address lookup process. Some protocols (such as IP V6 and UDP) do not necessarily have length fields in their headers. In these cases, no header length should be extracted.

Figure 4:
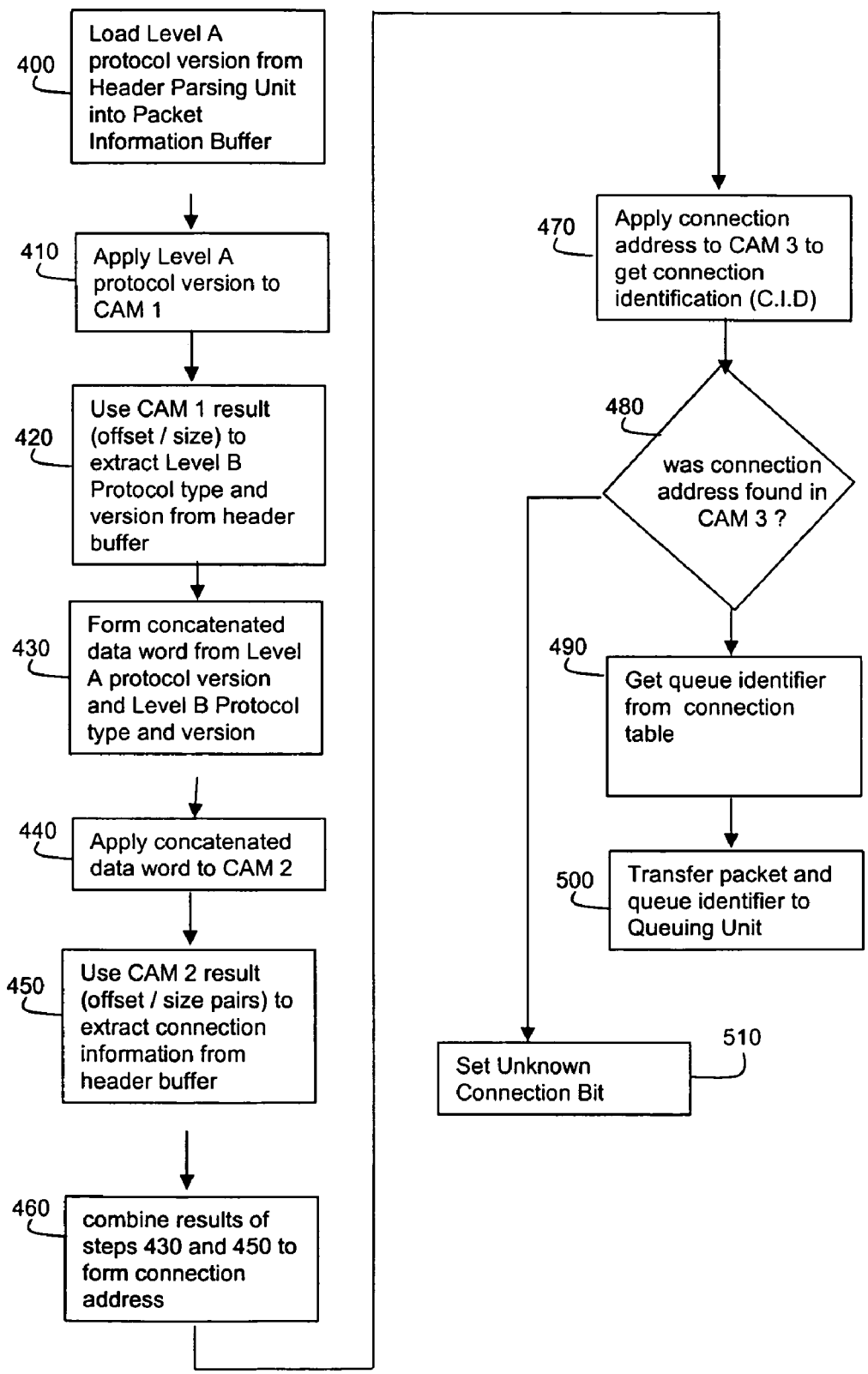
FIG. 4 is a flow diagram of an exemplary process for forming a connection address from a packet header.

FIG. 4 is a flow diagram of an exemplary process for forming a connection address from a packet header as may be employed by the system illustrated and described above with respect to FIGS. 2 and 3. With reference to the flow diagram in FIG. 4, at step 400, the Level A protocol version number (e.g. IP version) is loaded into packet information buffer 120 from Header Parsing Unit, 105.

At step 410, the Level A version number is used as a table lookup key into CAM1 130. At step 420, the output of CAM1 130, which contains the offset and size data, is employed to locate Level B information in header packet buffer 110. CAM1 130 contains all possible protocol values supported at the first address forming process stage. As shown and described herein with respect to FIG. 2, two protocol values are supported in this example, indicated as v21 and v22. In other embodiments—not shown—more than two protocol values are supported.

If, for example, the IP version from the table of CAM1 130 corresponds to v21, then the first offset/size table entries corresponding to this version are used at step 420 as an index into packet header buffer 110 to locate the protocol for the next inner layer. An entry with more than one set of offset/size fields per input address might be used to specify the position of a header length field for this layer so that this header length field can also be extracted. For simplicity only, the next layer's (typically layer 4) protocol 135 is shown as being extracted from packet header buffer 110 in FIG. 2. It is understood that various protocols do not identically match the OSI reference model, and protocol layers that vary from the suite of services associated with layer 4 may be accommodated.

Version number 125 and protocol value 135 are combined at step 430 to form concatenated data word 140 that is matched within the table of CAM2 150. The data matched in CAM2, 150 are shown as v31, v32, v33, and v34.

At step 440, the index of a CAM entry whose content matches the concatenated data word 140 from step 430 is used to access position register 152 of CAM2 150.

At step 450, this index is used to extract from the header a number of offset/size entries associated with the particular combination of layer 3 version and layer 4 protocol combined as 140. In the example CAM2 150 shown in FIG. 2, there are three pairs of offset/size data entries per CAM address, as well as three entries for miscellaneous use. In an exemplary version of the connection lookup hardware, up to eight fields can be extracted. In the example CAM2 150 in FIG. 2, three data sets are shown, each set associated with one data field to be extracted, each set comprising three sub-sets containing offset, size and miscellaneous data sets respectively. In other embodiments, different numbers of fields can be extracted.

At step 460, the multiple fields (110*a*, 110*b* 110*c*) extracted from packet header buffer 110 plus the protocol type value (e.g. v31, V32, v33 or v34) are concatenated together to form connection address 160. This address 160 is depicted in FIG. 2. At step 470, connection address 160 is applied to CAM3 170, and the output of CAM3 170 is the final connection identification number.

Connection Address Lookup

Connection address 160 is communicated to system processor 200, or other functional blocks, for use in processing the data packet. At step 470, connection address 160 is also used by the connection lookup hardware 104 to match an entry in CAM3 170 that contains connection addresses previously processed by system processor 200 since first power up or initialization by the system. With reference to FIG. 2, if one of the table entries in CAM3 170 matches the contents of connection address register 171, corresponding CAM entry index 172 is selected as the incoming packet connection identification number (C.I.D.).

At step 480, a decision point identifies which one of two flow paths is selected, depending on whether or not the connection address input to CAM3 170 was found in the table. If the connection address was not found in the table of CAM3 170, then, at step 510, unknown connection bit 173 is set as the output of CAM3 170 to indicate that the connection address was not found in the table. For example, a signal provided when a specific connection address is not found in the table might include a predefined logic level output signal input to the queuing unit 210, which, upon recognizing that the unknown connection bit is set, routes the packet to a dedicated queue, shown in FIG. 3 as unknown address queue 190. Unknown address queue 190 is a queue designated for unknown addresses for subsequent processing by the system.

If the connection address was found in the table of CAM3 170, then, at step 490, the output of CAM3 170 is a connection identification number, which is input to connection table 180 and corresponding queue identification number 181 is set. At step 500, the connection identification number is sent to the queuing unit 210, which connection identification number is used by the system processor 200 to derive other information used for packet processing by the system. Conventional memory 180 (FIG. 3) includes a connection table to store a block of data associated with each connection identification number. Possible data fields that might be associated with each connection identification number include: 1) queue identifier 181 (set in step 490) for system processor 200 to use for routing contents of a data packet to the correct queue in system processor queue 220 that is associated with each particular connection identification number; 2) header keep bit 182 for determining whether portions of the header should be stripped off before further processing, and/or 3) out of sequence queue identifier (183) for routing data packet contents when the packet arrives out of sequence.

CAM Initialization

System processor 200 loads CAM1 130 and CAM2 150 (FIG. 2) with indices 132, 152 and position registers 133, 153. The specific index and position register values are a function of the protocols that are to be recognized by the system. A feature of the example described herein is that, when new protocols become available, system processor 200 can load new CAM entries into the corresponding tables so that connection lookup hardware 100 can operate when new protocols that were not available when the hardware was first installed become available.

With respect to connection address CAM 3 170, upon first time power-up, the state of the connection address table of CAM3 170 is as follows. As no connections have been established at that time, there are no connection addresses associated with any of the table entries. The table in CAM3 170 is populated only with the connection addresses which have previously been analyzed and established by the system processor 200.

Connection address-forming hardware 104 is set up to transfer to unknown address queue 190 any data packets that have unrecognized connection data. In this case, an unrecognized address is sent to unknown address queue 190 for later processing by system processor 200. On initial startup, this will be the case for every data packet originating from a distinct connection address. Instead of sending a connection identification number to the queuing unit 210, the connection hardware sends unknown connection bit 171 to the queuing unit 210, indicating a connection miss, and sends the unknown address to unknown address queue 190. System processor 200 then fully processes these data packets from unknown address queue 190 (i.e., system processor 200 determines the connection address independently of connection address hardware 100 and loads appropriate data for that connection into the table of CAM3 170).

System processor 200 is responsible for connection set up and tear down. Once a connection is torn down, the system processor 200 makes that connection address location in CAM3 170 available for a new connection. Thus, system processor 200 is responsible for recycling space in CAM3 170.

While exemplary embodiments of the present invention have been described with respect to digital logic blocks, as would be apparent to one skilled in the art, various functions may be implemented in the digital domain as processing steps in a software program, in hardware by circuit elements, or in combination of both software and hardware. Such software may be employed in, for example, a digital signal processor, micro-controller, or general-purpose computer. Such hardware and software may be embodied within circuits implemented within an integrated circuit.

The present invention can be embodied in the form of methods and apparatuses for practicing those methods. The present invention, in sum or in part, can also be embodied in the form of program code embodied in tangible media, such as floppy diskettes, CD-ROMs, hard-drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber-optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

The foregoing discussion of exemplary embodiments has been presented for purposes of illustration and description. The description does not limit the invention to the form disclosed herein. Consequently, variations and modifications commensurate with the above teachings and with the skill and knowledge of the relevant art are within the scope of the present invention. The embodiments described above explain the best mode presently known by the inventors of practicing the invention and enable others skilled in the art to utilize the invention as such, or in other embodiments, and with the various modifications required by their particular application or uses of the invention. The appended claims shall be construed to include alternative embodiments and equivalents to the extent permitted by the prior art.

What is claimed is:

1. A method for processing a header of a data packet comprising:
   generating, with a first look-up table, a first data packet header offset and a first data size corresponding to a communications protocol type;
   extracting said communications protocol type of said header;
   generating, with a second look-up table, a second data packet header offset and a second data size corresponding to a first partial connection address offset based on said communications protocol type;
   extracting said first partial connection address from said header based on said first partial connection address offset and said second data size information;
   extracting a protocol header length field from said header of the data packet; and
   loading said second look-tip table with header offset and data size information based at least in part on the value of said protocol header length field.

2. The method of claim 1, further comprising:
   generating with a third look-up table, a connection identifier based on said first partial connection address.

3. The method of claim 2, further comprising:
   generating with a fourth look-up table, information related to said connection identifier.

4. The method of claim 2, further comprising:
   re-programming said third look-up table after a first reception of said first partial connection address.

5. The method of claim 1, further comprising:
   generating, with said second look-tip table, a third data packet header offset and a third data size corresponding to a second partial connection address offset based on said communications protocol type;
   extracting said second partial address from said header based on said second partial connection address offset and said third data size information;
   combining said first partial connection address and said second partial connection address to form a connection address.

6. The method of claim 5, further comprising:
   loading said third look-up table with data associated with each first and second partial connection address.

7. A computer readable storage medium encoded with computer program code, wherein, when the computer program code is executed by a processor, the processor performs a method for reading packet header data comprising the steps of:
   generating, with a first look-up table, a first data packet header offset and a first data size corresponding to a communications protocol type;
   extracting said communications protocol type of said header;
   generating, with a second look-up table, a second data packet header offset and a second data size corresponding to a partial connection address offset based on said communications protocol type;
   extracting said partial connection address from said header based on said partial connection address offset and said second data size information;
   extracting a protocol header length field from said header of a data packet;
   loading said second look-tip table with header offset and data size information based at least in part on the value of said protocol header length field; and
   storing a queue identification number based in part on the partial connection address in a queuing unit.

8. The computer readable storage medium of claim 7, further comprising:
   generating, with said second look-up table, a third data packet header offset and a third data size corresponding to a second partial connection address offset based on said communications protocol type;
   extracting said second partial connection address from said header based on said second partial connection address offset and said third data size information;
   combining said first partial connection address and said second partial connection address to form a connection address.

9. The computer readable storage medium of claim 8, further comprising:
   generating with a third look-up table, the queue identification number based on the connection address.

10. The method of claim 9, further comprising:
    generating with a fourth look-tip table, information related to said connection address.

11. The method of claim 9, further comprising:
    re-programming said third look-up table after a first reception of said connection address.

* * * * *